(12) United States Patent
Beramendi Ortega et al.

(10) Patent No.: US 10,260,480 B2
(45) Date of Patent: Apr. 16, 2019

(54) WIND POWER PLANT FOUNDATION AND WIND POWER PLANT

(71) Applicant: WOBBEN PROPERTIES GMBH, Aurich (DE)

(72) Inventors: Hugo Rodrigo Beramendi Ortega, Aurich (DE); Britta Randel, Elbe-Parey (DE); Roy Kersten, Hohenwarthe (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/553,963

(22) PCT Filed: Feb. 23, 2016

(86) PCT No.: PCT/EP2016/053785
§ 371 (c)(1),
(2) Date: Aug. 25, 2017

(87) PCT Pub. No.: WO2016/135148
PCT Pub. Date: Sep. 1, 2016

(65) Prior Publication Data
US 2018/0073487 A1  Mar. 15, 2018

(30) Foreign Application Priority Data
Feb. 27, 2015 (DE) .................. 10 2015 203 574

(51) Int. Cl.
*F03D 13/20* (2016.01)
*E02D 27/42* (2006.01)
(Continued)

(52) U.S. Cl.
CPC ............. *F03D 13/22* (2016.05); *E02D 5/223* (2013.01); *E02D 5/50* (2013.01); *E02D 27/425* (2013.01);
(Continued)

(58) Field of Classification Search
CPC ....... E02D 27/425; E02D 27/42; E02D 27/50; E02D 2250/0023; E02D 2300/002;
(Continued)

(56) References Cited

U.S. PATENT DOCUMENTS 9,206,617 B2  12/2015  Wobben
9,670,909 B2  6/2017  Hölscher
(Continued)

FOREIGN PATENT DOCUMENTS

CN  101886400 A  11/2010
CN  103758148 A  4/2014
(Continued)

*Primary Examiner* — Carib A Oquendo
(74) *Attorney, Agent, or Firm* — Seed Intellectual Property Law Group LLP (57) ABSTRACT

A wind power installation foundation having a cylindrical central unit, a plurality of steel carriers which are arranged radially around the central unit and which respectively have a first and a second end, and a plurality of foundation piles. The first ends of the steel carriers are fixed to the central unit so that the second ends of the steel carriers are in the form of free ends. The second free ends of the steel carriers are respectively placed on one of the foundation piles.

12 Claims, 14 Drawing Sheets

(51) Int. Cl.
*E02D 5/22* (2006.01)
*E02D 5/50* (2006.01)
*E02D 5/28* (2006.01)
*E02D 5/30* (2006.01)

(52) U.S. Cl.
CPC ............... *E02D 5/285* (2013.01); *E02D 5/30* (2013.01); *E02D 2200/1685* (2013.01); *E02D 2250/0023* (2013.01); *E02D 2300/002* (2013.01); *F05B 2230/60* (2013.01); *F05B 2280/1071* (2013.01)

(58) Field of Classification Search
CPC ... E02D 2200/1685; E02D 5/223; E02D 5/50; F03D 13/22; F03D 13/10; F03D 13/20
See application file for complete search history.

(56) References Cited

U.S. PATENT DOCUMENTS

| | | | |
|---|---|---|---|
| 2009/0217607 A1* | 9/2009 | Stark | E02D 27/42 52/298 |
| 2011/0061321 A1* | 3/2011 | Phuly | E02D 27/42 52/297 |
| 2012/0057979 A1* | 3/2012 | Schellstede | F03D 1/001 416/169 R |
| 2012/0070233 A1* | 3/2012 | Wang | E02D 27/42 405/232 |
| 2012/0128436 A1 | 5/2012 | Harris | |
| 2012/0210662 A1 | 8/2012 | Jolly | |
| 2012/0282036 A1* | 11/2012 | Taenaka | E02B 17/027 405/224.2 |
| 2013/0139453 A1 | 6/2013 | Jolly | |
| 2014/0115978 A1 | 5/2014 | Fairbairn | |
| 2015/0376859 A1* | 12/2015 | Phuly | F03D 13/22 52/223.1 |
| 2017/0030045 A1* | 2/2017 | Krause | E02D 27/425 |
| 2017/0183840 A1* | 6/2017 | Tozer | E02D 27/016 |

FOREIGN PATENT DOCUMENTS

| | | |
|---|---|---|
| DE | 102013216343 A1 | 2/2015 |
| GB | 2460551 A | 12/2009 |
| JP | 2010-159625 A | 7/2010 |
| JP | 2013-087481 A | 5/2013 |
| JP | 2013-542364 A | 11/2013 |
| WO | 2005095792 A1 | 10/2005 |

* cited by examiner

WIND POWER PLANT FOUNDATION AND WIND POWER PLANT

BACKGROUND

Technical Field

The present invention concerns a wind power installation foundation and a wind power installation.

Description of the Related Art

Any wind power installation requires a foundation, on which a pylon of the wind power installation can be placed. Very specific demands are made on foundations of wind power installations as the foundation has to reliably carry forces and torques acting on the wind power installation. Those forces and torques are produced both by the wind which acts on the wind power installation and also due to rotation of the rotor of the wind power installation.

In the German patent application from which priority is claimed the German Patent and Trade Mark Office searched the following documents: DE 2013 216 342 A1 and US 2014/0115978 A1.

BRIEF SUMMARY

Provided is a wind power installation foundation having a cylindrical central unit, a plurality of steel carriers which are arranged radially around the central unit and which respectively have a first and a second end, and a plurality of foundation piles. The first ends of the steel carriers are fixed to the central unit so that the second ends of the steel carriers are in the form of free ends.

The second free ends of the steel carriers are respectively placed on one of the foundation piles.

According to an aspect of the present invention the wind power installation foundation has a plurality of leveling plates which are arranged on the foundation piles and which are after suitable leveling receive the second free ends of the steel carriers.

According to a further aspect of the present invention the wind power installation foundation has a plurality of precast concrete parts which are respectively placed between adjacent steel carriers so that the precast concrete parts and the adjacent steel carriers afford a trough which can be filled for example with concrete.

According to a further aspect of the present invention the central unit has a first end and a second end, wherein a lower pylon segment of a wind power installation or a pylon section can be placed on the second end of the central unit.

According to a further aspect of the present invention in the region of its second ends the steel carrier has reinforcing struts.

According to a further aspect of the present invention the foundation piles in the region of their upper end respectively have a foundation anchor for fixing the respective second ends of the steel carriers.

According to a further aspect of the present invention the foundation piles have a first, second and third portion, wherein the diameter of the third portion is larger than that of the first or second portion.

According to a further aspect of the present invention the first, second and third portions of the foundation piles are each in the form of a tube.

According to a further aspect of the present invention the foundation piles respectively have a plurality of struts or bars extending in the longitudinal direction and at least one coil.

According to a further aspect of the present invention the foundation piles are filled with concrete.

Provided is a wind power installation having a wind power installation foundation as described above.

The second free ends of the steel carriers are respectively placed on one of the foundation piles.

Provided is a method of producing a wind power installation foundation, in particular for permafrost grounds. A cylindrical central unit is placed and a plurality of steel carriers is arranged radially around the central unit. The steel carriers have a first and a second end, wherein the first ends of the steel carriers are fixed to the central unit so that the second ends are in the form of free ends. A plurality of foundation piles is at least partially placed in or driven into the ground. The second free ends of the steel carriers are respectively placed on the ends, projecting out of the ground, of the foundation piles.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

The wind power installation foundation is essentially a steel foundation having a cylindrical central unit and steel arms or steel carriers projecting radially therefrom. The central unit and the steel arms together form a foundation star. The free ends of the steel arms respectively rest on a foundation pile. Precast concrete parts are placed between adjacent steel arms so that the adjacent steel arms and the precast concrete parts afford a trough which can be filled with concrete, gravel and/or earth. As an alternative thereto the trough can also be filled with prefabricated concrete parts. Thus the wind power installation foundation represents a pile foundation. The foundation represents a hybrid foundation consisting of a combination of steel carriers and precast concrete parts.

The foundation is suitable in particular for permafrost grounds.

Figure 1:
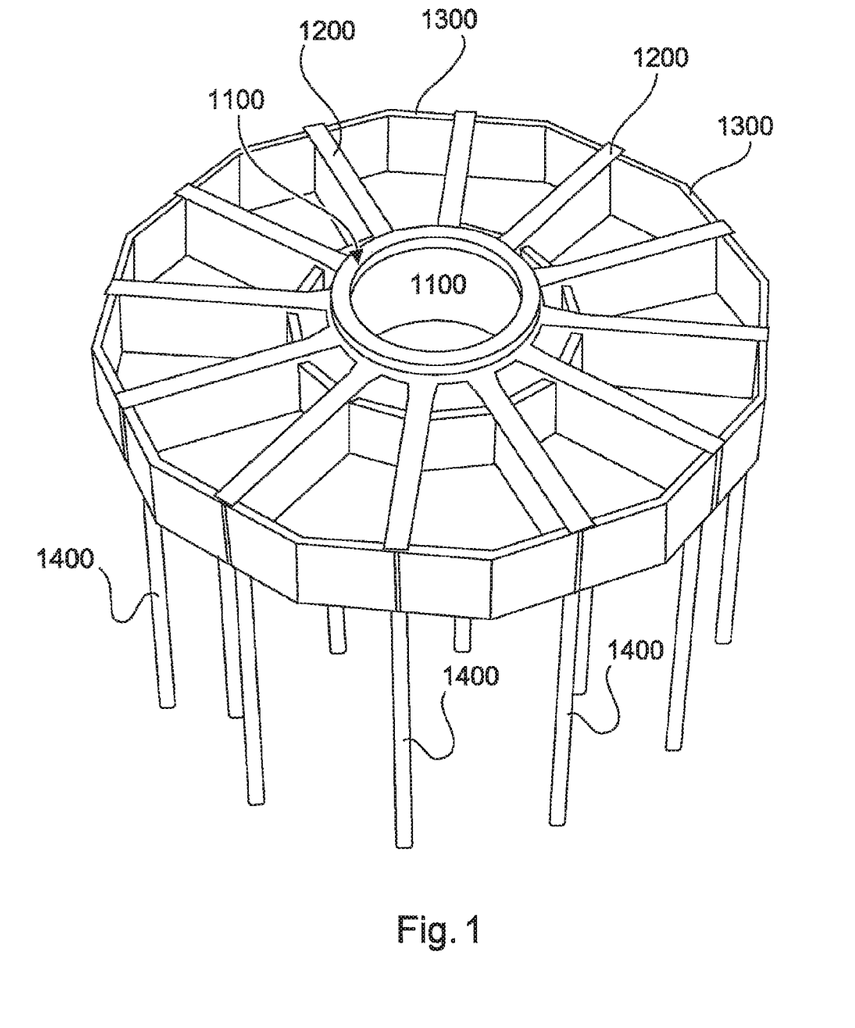
FIG. 1 shows a diagrammatic perspective view of a foundation of a wind power installation according to a first embodiment.

FIG. 1 shows a diagrammatic perspective view of a foundation of a wind power installation according to a first embodiment. The wind power installation foundation has a cylindrical central unit 1100 and a plurality of radially extending steel arms or steel carriers 1200. A first end of the steel arms is fixed to the cylindrical central unit 1100 while the other second free end of the steel arms or steel carriers 1200 rests on a respective foundation pile 1400. In other words only the second free ends of the radially extending steel arms 1200 rest on the foundation piles 1400.

Precast concrete parts 1300 are placed between the steel arms 1200 so that a trough is formed.

Figure 2:
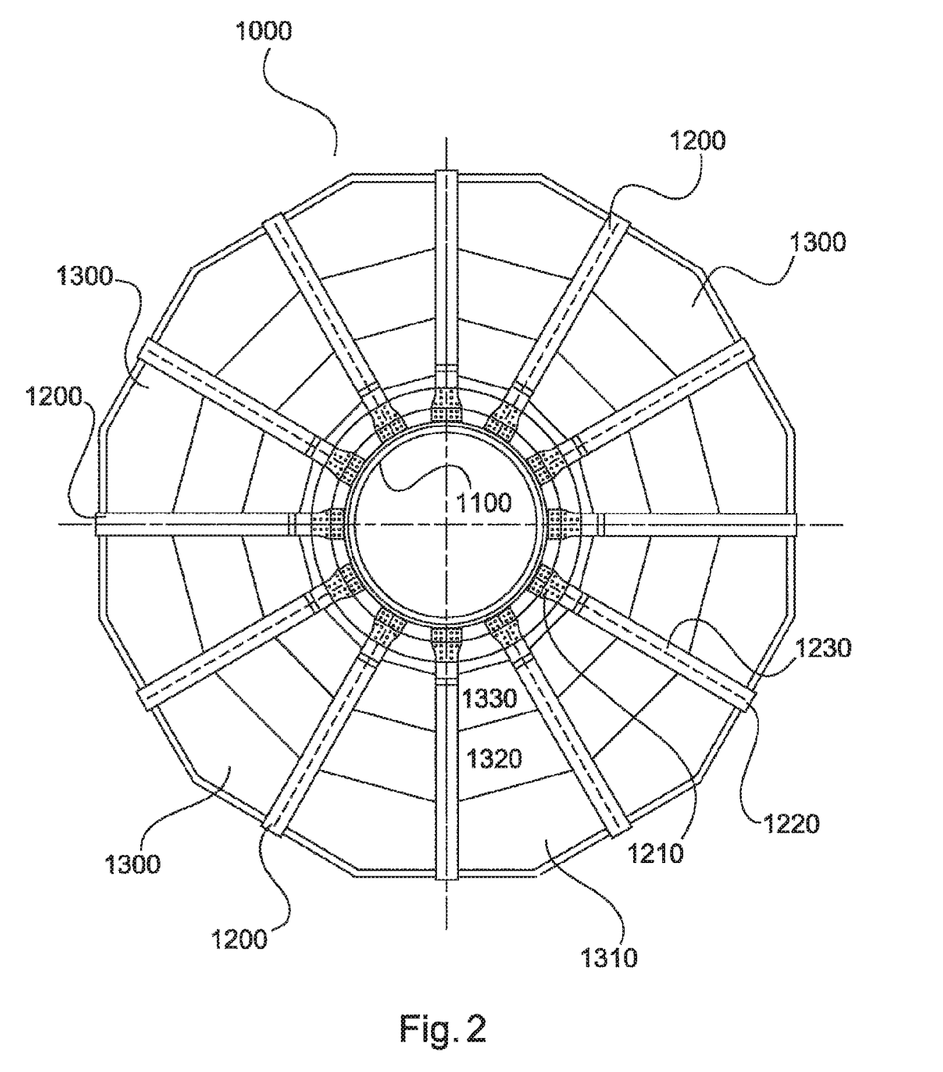
FIG. 2 shows a plan view of a foundation of a wind power installation according to a second embodiment.

FIG. 2 shows a plan view of a foundation of a wind power installation according to a second embodiment. The wind power installation foundation 1000 according to the second embodiment can correspond to the wind power installation foundation according to the first embodiment. The wind power installation foundation 1000 has a cylindrical central unit 1100. A plurality of steel arms or steel carriers 1200 are fixed with their first end to the central unit 1100. The steel arms or steel carriers 1200 extend radially from the central unit 1100. Optionally the angle between two adjacent steel carriers or steel arms 1200 is 30° so that for example there are 12 steel arms or steel carriers 1200. Precast concrete parts 1300 are provided between two adjacent steel arms or steel carriers 1200. In particular there are respectively provided three precast concrete parts 1310, 1320, 1330. The first precast concrete part 1310 is provided at the exterior and has a wall. The second precast concrete part 1320 is provided in the center and the third precast concrete part 1330 is towards the central unit 1100 and can have a further wall. A trough is defined by the three precast concrete parts and the two adjacent steel carriers.

Figure 3A:
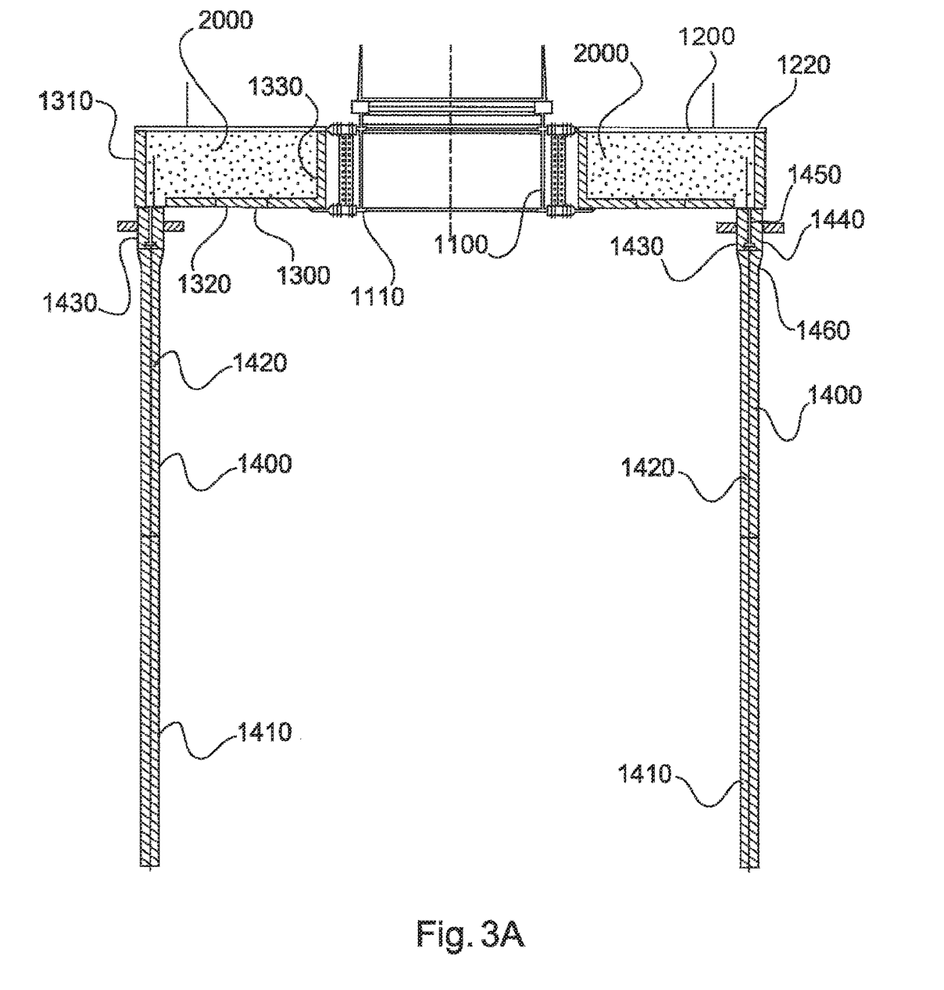
FIG. 3A shows a sectional view of a foundation of a wind power installation according to a third embodiment.

FIG. 3A shows a sectional view of a foundation of a wind power installation according to a third embodiment. A plurality of steel arms or steel carriers 1200 is provided around the cylindrical central unit 1100. The free ends of the steel carriers 1200 rest on foundation piles 1400. Each foundation pile 1400 has a first lower portion 1410, a second central portion 1420 and a third upper portion 1430. The steel arms or steel carriers 1200 in that case rest on the third portion 1430. The free ends 1220 of the steel arms 1200 can be fixed for example by segment anchors 1440 and rods like for example threaded rods 1450 to the third portions 1430 of the foundation piles 1400. Provided between the steel arms 1200 are the precast concrete parts 1310, 1320 and 1330, the first concrete parts 1310 having an outside wall and the third precast concrete parts 1330 having an inside wall. Thus a trough which can be filled by sand, earth, gravel or concrete 2000 is defined by the first through third precast concrete parts and the two adjacent steel arms 1200.

Figure 3B:
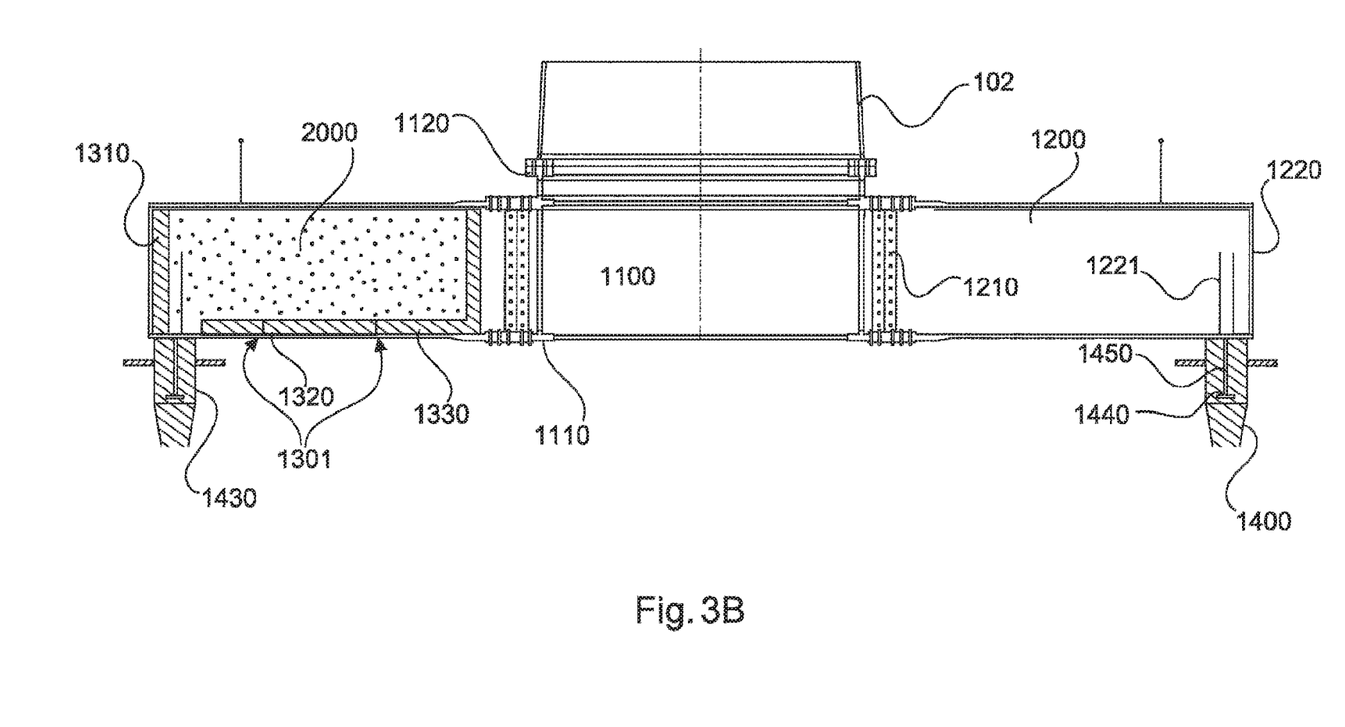
FIG. 3B shows a sectional view of a portion of the foundation of the wind power installation according to the third embodiment.

FIG. 3B shows a sectional of a portion of the foundation of the wind power installation according to the third embodiment. The wind power installation foundation has a cylindrical central unit 1100 with a plurality of steel arms or steel carriers 1200 fixed thereto and extending radially therefrom. Provided between the steel carriers are precast concrete parts 1300 which together with the steel carriers form a trough into which sand, earth, gravel, concrete 2000 can be filled. The precast concrete parts 1310, 1320, 1330 can have drainage openings 1301.

The free ends 1220 of the steel arms 1200 rest on the third portions 1430 of the foundation piles 1400. The second (free) ends 1220 of the steel arms can be respectively fixed to one of the foundation piles 1400 by way of foundation anchors 1400 and foundation anchors 1450. The first ends 1210 of the steel carriers 1200 are respectively fixed to the central unit 1100.

The central unit 1100 has a first (lower) side 1110 and a second (upper) side 1120. Placed on the second (upper) side 1120 is a lower pylon segment 102 or pylon section of the wind power installation.

Figure 3C:
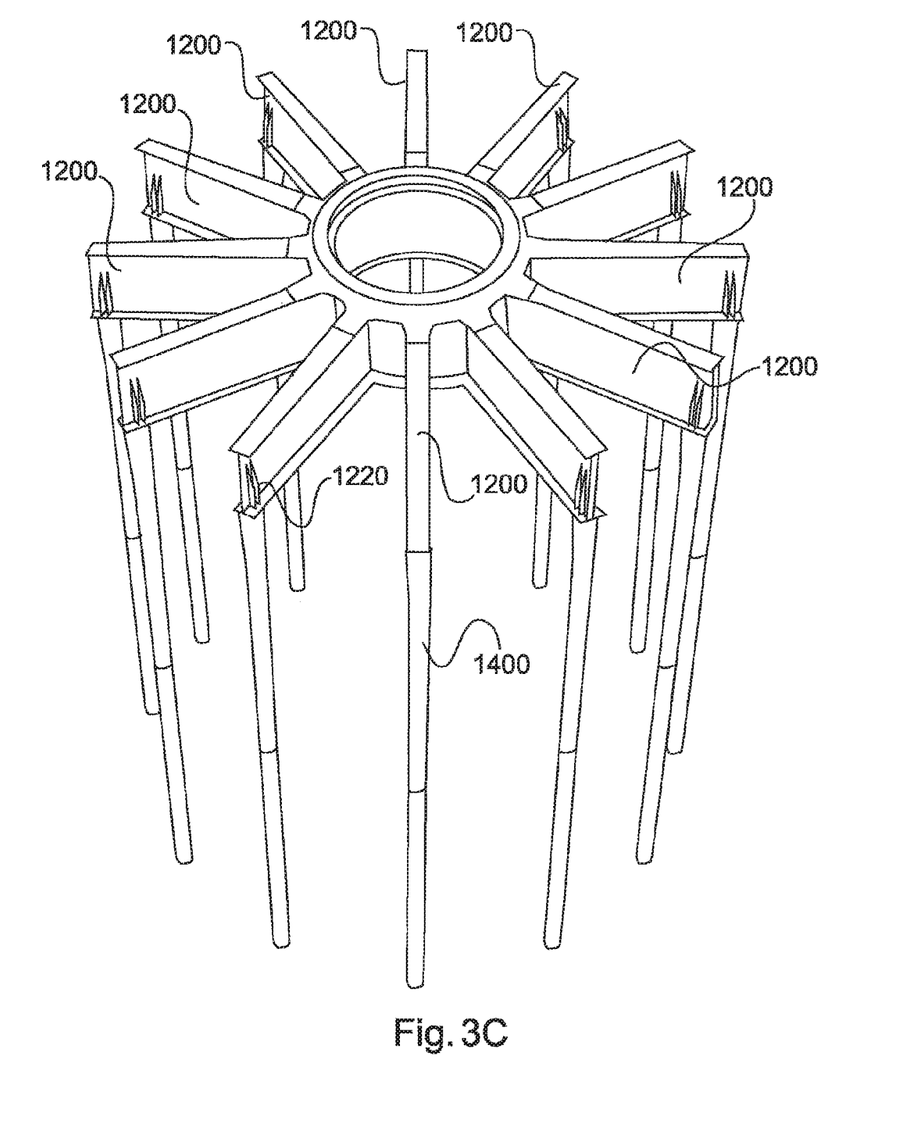
FIG. 3C shows a perspective diagrammatic view of a part of a foundation of a wind power installation according to the third embodiment.

FIG. 3C shows a diagrammatic perspective view of a part of a foundation of a wind power installation according to the third embodiment. FIG. 3C shows the foundation of the wind power installation without the precast concrete parts. In that way it is possible to see in particular the cylindrical central unit 1100 as well as the radially extending steel arms or steel carriers 1200, that is to say the foundation star. In this case the free ends 1220 of the steel carriers respectively rest on a foundation pile 1400 so that this arrangement provides a pile foundation.

FIGS. 4A-4F show various views of the foundation piles.

Figure 4A:
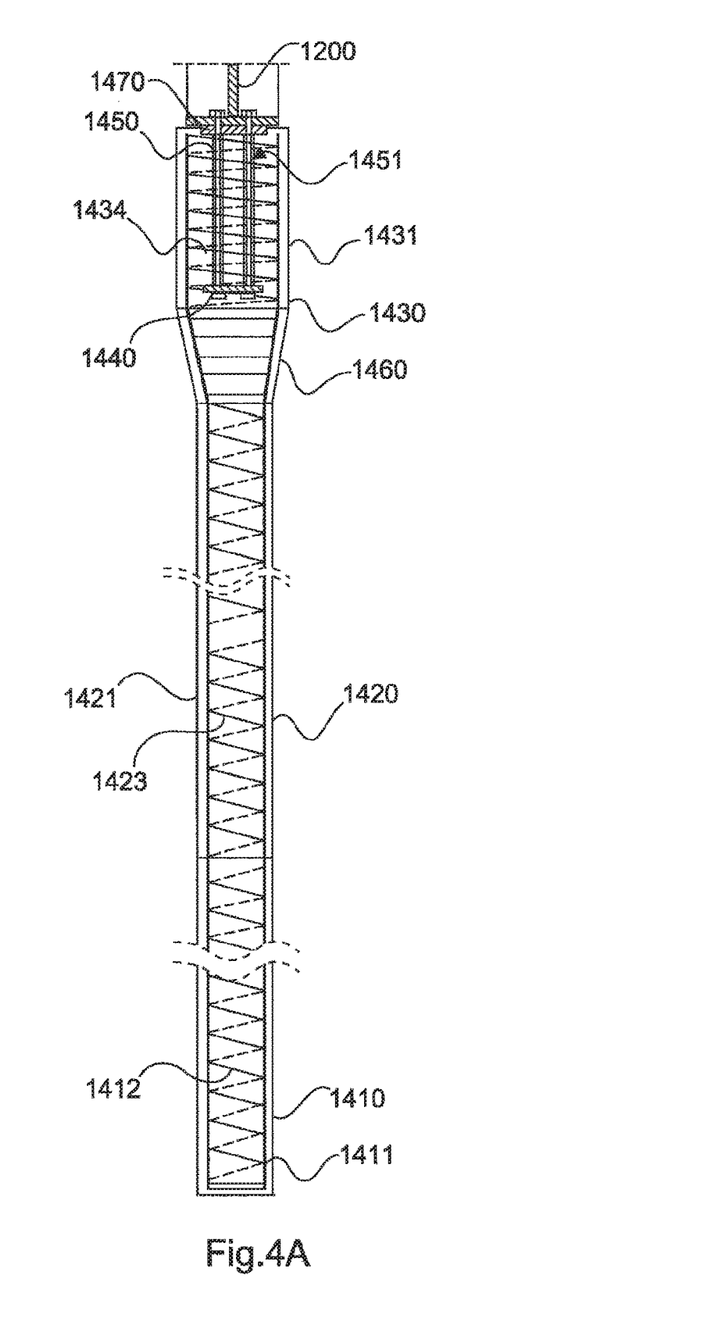
FIG. 4A shows a sectional view of a foundation pile of a foundation.

FIG. 4A shows a sectional view of a foundation pile of a foundation. The foundation pile 1400 has a first, second and third portion 1410, 1420, 1430. In that arrangement the first portion 1410 is the lowermost portion while the second portion 1420 represents the central portion. The third portion 1430 is the upper portion on which the free ends 1220 of the steel carriers 1200 rest. Provided in the third portion 1430 are a respective segment anchor 1440 and two threaded bolts 1450. The threaded bolts 1450 can be disposed within a PU foam tube 1451.

Provided on the top side of the third portion 1430 is a respective leveling plate 1470. The third portion 1430 of the foundation pile 1400 can be fixed by means of the threaded bolts 1450 to a lower end of the steel arm or steel carrier 1200. Before the steel carriers 1200 are fixed in place the respective leveling plates 1470 of the respective foundation piles 1400 can be leveled so that the undersides of the respective steel carriers or steel arms 1200 are leveled, whereby the central unit is also leveled. Leveling of the central unit 1100 is highly important because a lower pylon segment or pylon section 102 can be placed on the second side 1120 of the central unit 1100. The pylon 102 of the wind power installation can be oriented exactly vertically only when the second (upper) side 1120 of the central unit 1100 is oriented exactly horizontally. That exact horizontal orientation is achieved by placement and orientation of the leveling plates 1470 on the upper ends of the third portions 1430 of the foundation piles 1200.

The third portion 1430 of the foundation pile 1400 has a steel tube 1431 and a coil or spiral 1434.

The threaded bolts 1450 can have a thread at least at their two ends. No thread has to be provided in the region therebetween, that is to say in the central portion.

Provided between the first and second portions 1430, 1420 is a steel funnel-shaped portion 1460 which reduces the diameter of the third portion 1430 to the diameter of the second portion 1420.

The second portion 1420 also has a steel tube 1421 and a second coil or spiral 1423.

The first portion 1410 also has a steel tube 1411 which is of the same diameter as the steel tube 1421 of the second portion. A coil or spiral 1412 is provided within the steel tube 1411.

Figure 4B:
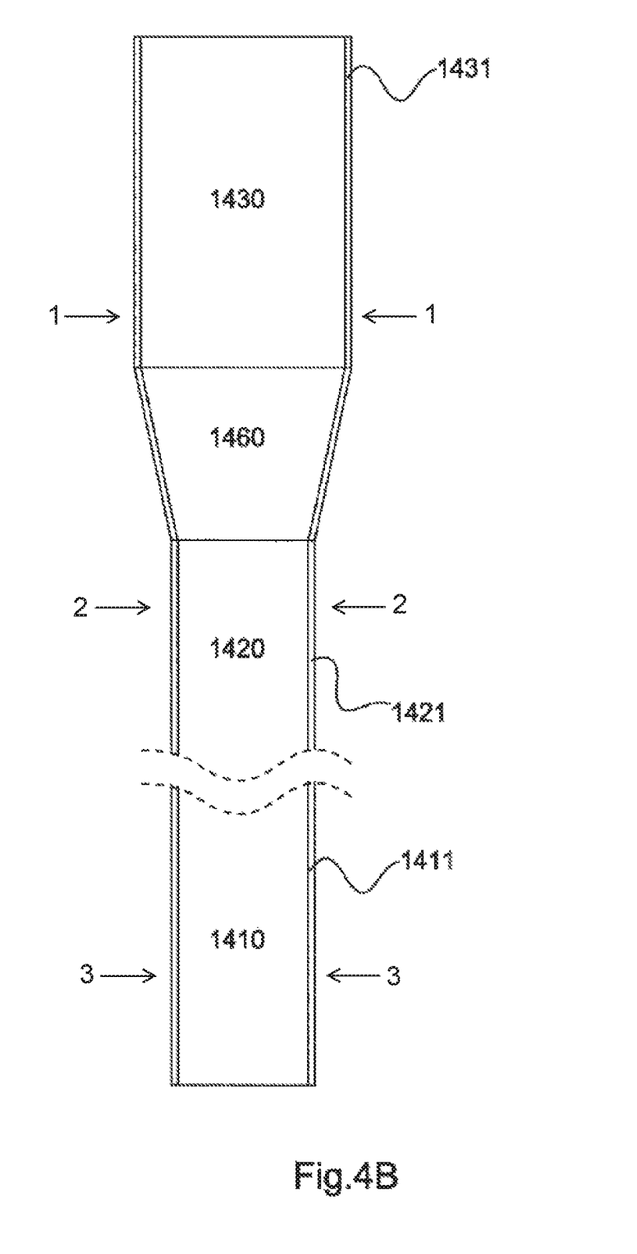
FIG. 4B shows a diagrammatic sectional view of a tube of the foundation pile of FIG. 4A, FIGS. 4C-4E each show a sectional view of the pile of FIG. 4A.

FIG. 4B shows a diagrammatic sectional view of a tube of the foundation pile of FIG. 4A. FIG. 4B shows the first, second and third portions 1410, 1420, 1430 and the funnel-shaped portion 1460 between the second and third portions. The funnel-shaped portion 1460 serves to adapt the diameter of the third portion 1430 to the diameter of the second portion 1420. The first portion 1410 has a first steel tube 1411, the second portion 1420 has a second steel tube 1421 and the third portion 1430 has a third steel tube 1431.

Figure 4C:
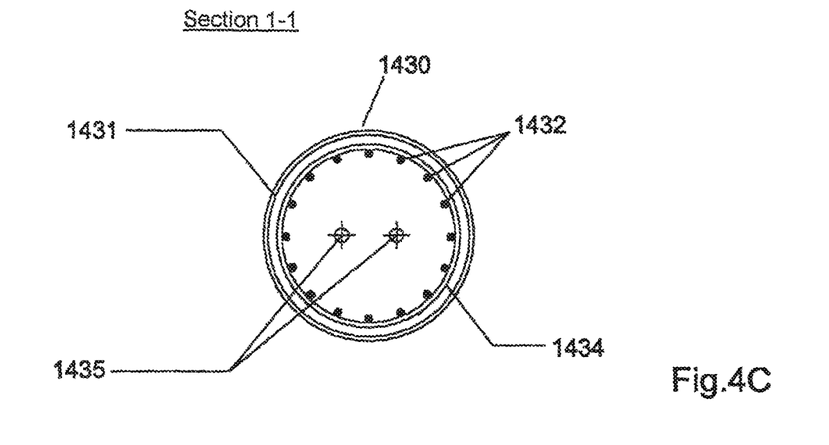

FIG. 4C shows a sectional view along section line 1-1 in FIG. 4B in the region of the third portion 1430. The third portion 1430 has a steel tube 1431, for example sixteen bars 1432, a coil or spiral 1434 and two bores 1435 serving to receive the threaded bolts 1450. The steel tube 1431 can for example be filled with concrete.

Figure 4D:
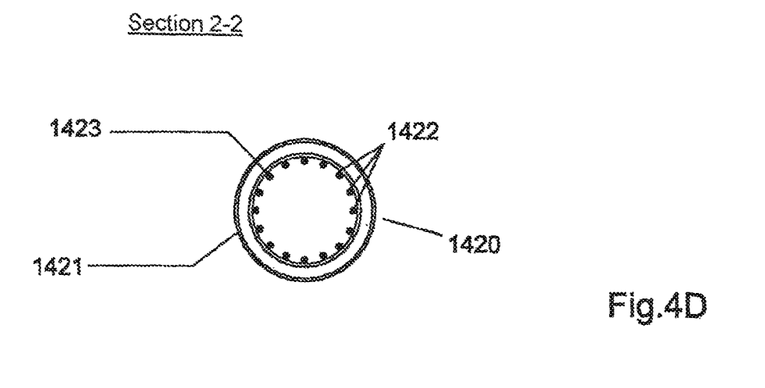

FIG. 4D shows a sectional view along section line 2-2 in FIG. 4B in the region of the second portion 1420 of the foundation pile 1400. The second portion 1420 has a second steel tube 1421, a coil or spiral 1423 and for example sixteen bars 1422.

The steel tube 1421 of the second portion 1420 can for example be filled with concrete.

Figure 4E:
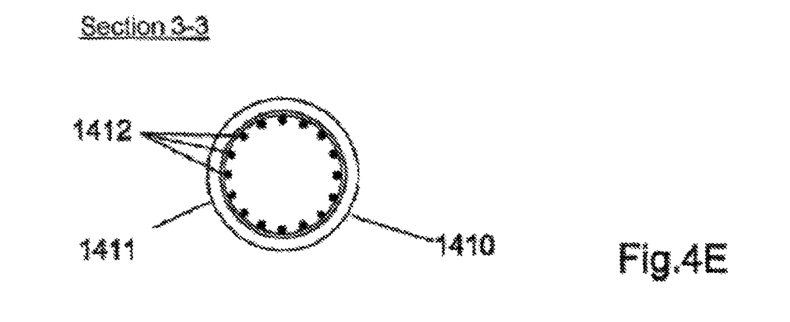

FIG. 4E shows a sectional view along section line 3-3 in FIG. 4B in the region of a first portion 1410 of the foundation pile 1400.

Figure 4F:
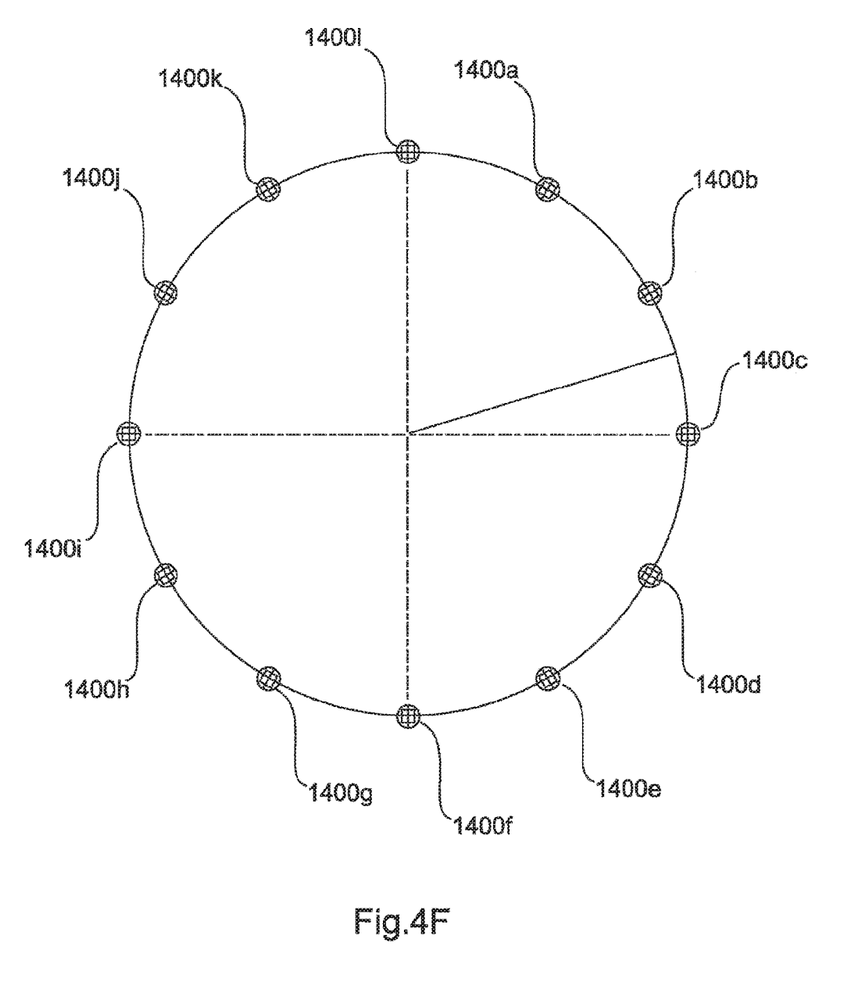
FIG. 4F shows a diagrammatic arrangement of the foundation piles in a, FIG. 5A shows a sectional view of a central unit of a foundation of a wind power installation.

FIG. 4F shows a diagrammatic view of the arrangement of 12 foundation piles 1400a-1400l. The free ends of the steel carriers or steel arms 1200 are placed on those piles.

Figure 5A:
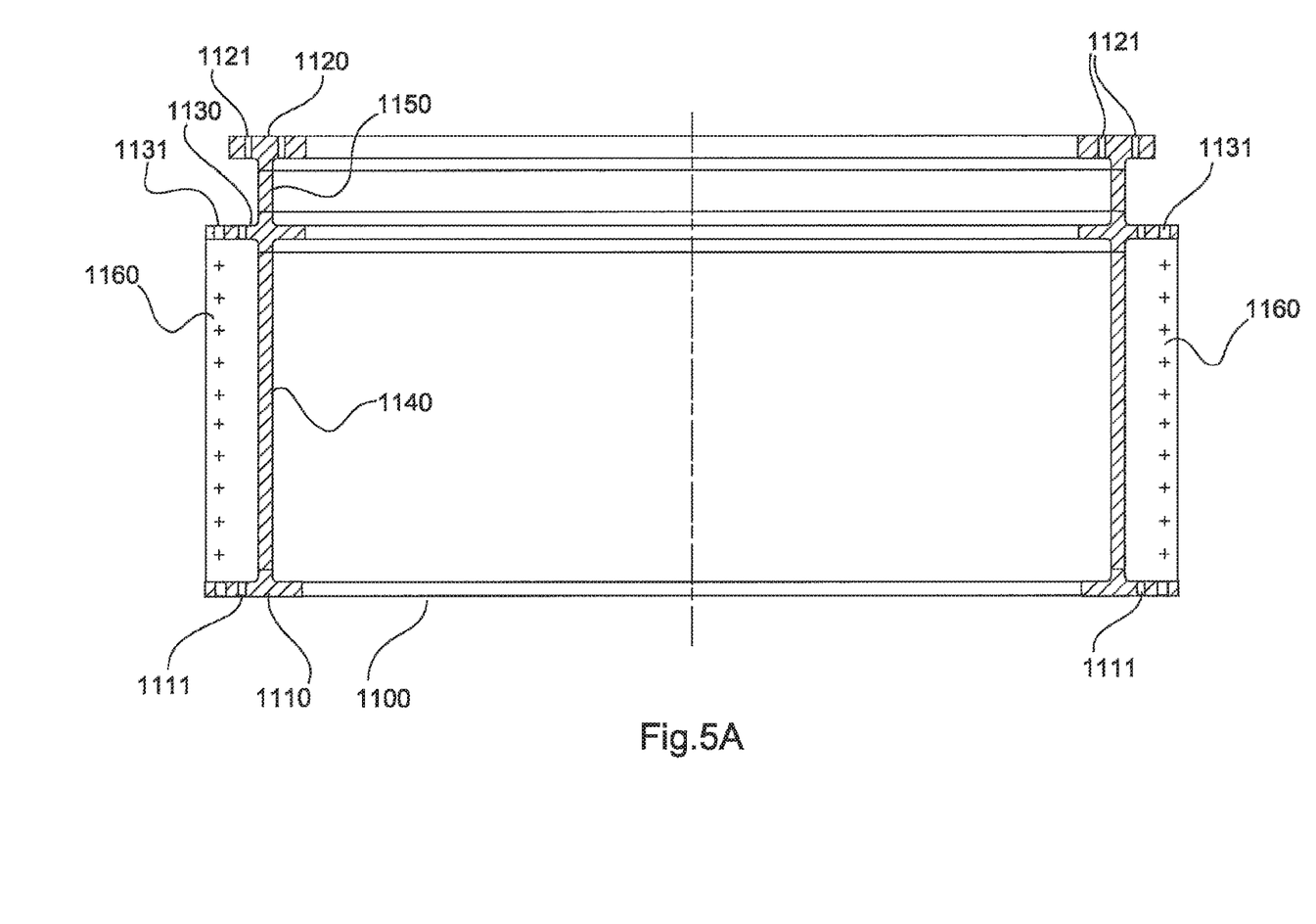

FIG. 5A shows a sectional view of a central unit of a foundation of a wind power installation. The central unit 1100 is of a cylindrical configuration and has a first (lower) end 1110, a second (upper) end 1120, a first portion 1140 and a second portion 1150. A flange 1130 having a plurality of bores 1131 is provided between the first and second portions 1140 and 1150.

A flange having a plurality of bores 1111 is also provided at the first (lower) end 1110. The second (upper) end 1120 also has a plurality of bores 1121. Provided in the region of the first portion 1140 at the outside is a plurality of fixing portions 1160 which serve to provide that the respective first sides (1210) of the steel arms or steel carriers 1200 are fixed or welded thereto.

Figure 5B:
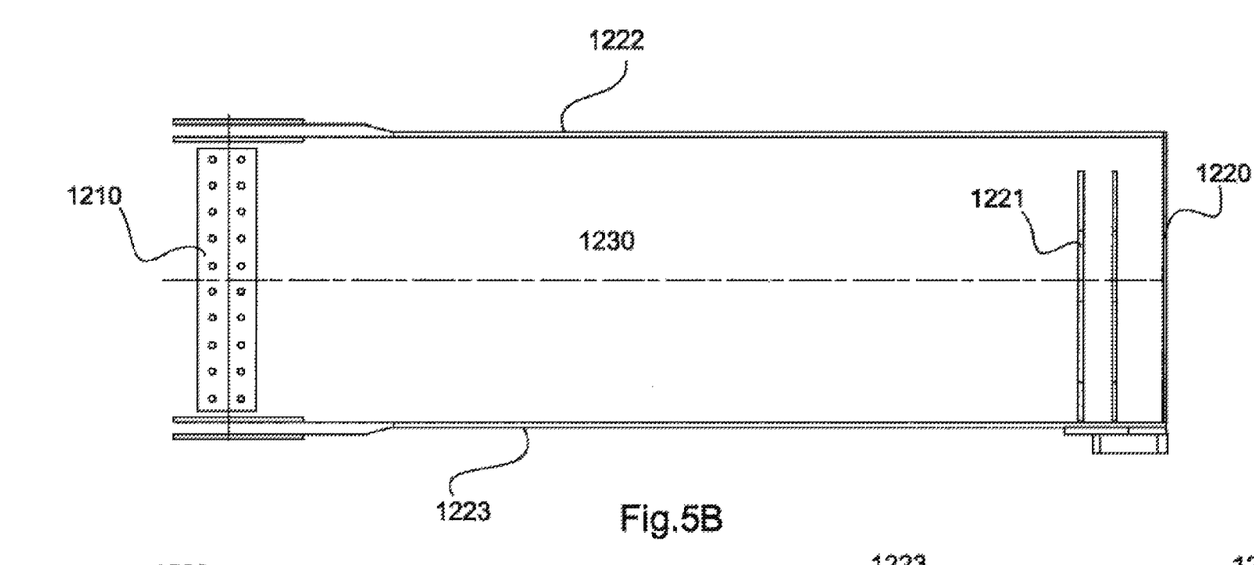
FIG. 5B shows a diagrammatic plan view of the steel carrier of the foundation.

FIG. 5B shows a diagrammatic plan view of a steel carrier of the foundation. The steel arm or steel carrier 1200 has a first end 1210 and a second end 1220, the first end 1210 being fixed to the central unit and in particular to the fixing portion 1160. The second ends 1220 have support struts 1221 on both sides. The steel carrier or steel arm 1200 has a first (lower) side 1223 and a second (upper) side 1222. Optionally the respective first ends 1210 of the steel carriers 1200 can be welded to the fixing portions 1160 of the central unit 1100. The steel carriers 1200 each have a central portion 1230 extending between the first and second sides 1223, 1222. The central portion 1230 can be for example in the form of a steel plate.

Figure 5C:
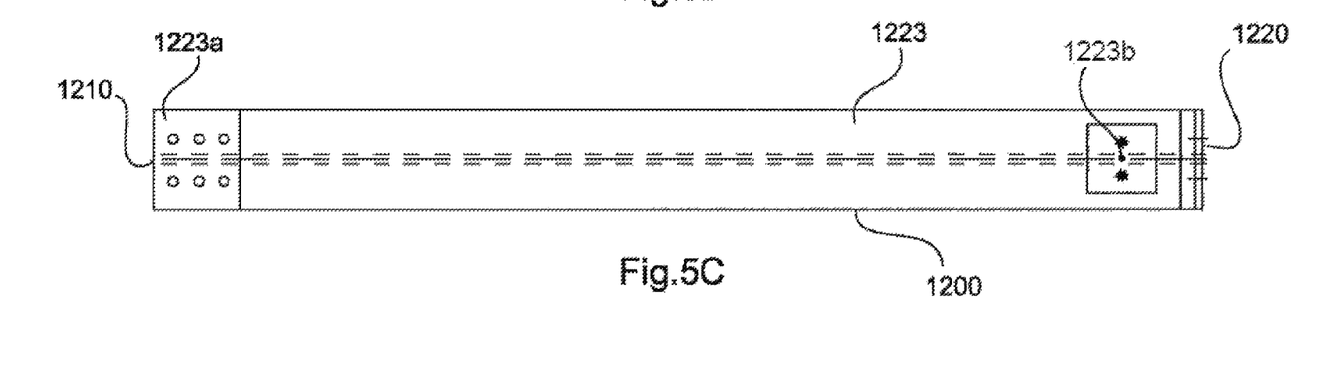
FIG. 5C shows a further plan view of a steel carrier of the foundation of FIG. 5B.

FIG. 5C shows a further plan view of an arm of the foundation of FIG. 5B. FIG. 5C shows in particular the first (lower) side 1223. A fixing weld portion 1223a is provided in the region of the first side 1210 of the steel carrier 1200. A plate 1223b is provided in the region of the second side 1220 of the steel carrier 1200.

Figure 5D:
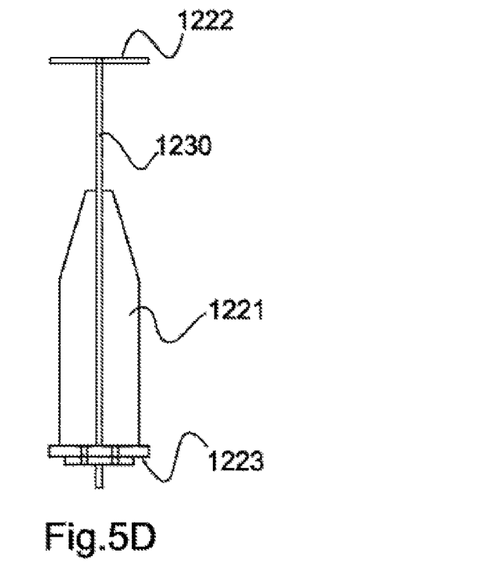
FIG. 5D shows a plan view of an end of a steel carrier as shown in FIG. 5A.

FIG. 5D shows a plan view of an end of an arm as shown in FIG. 5A. FIG. 5D shows a side view of a steel carrier of a foundation. The steel carrier has a first (lower) side 1223, a second (upper) side 1222 and a plate 1230 therebetween. Reinforcing struts 1221 are provided on both sides of the plate 1230.

Figure 5E:
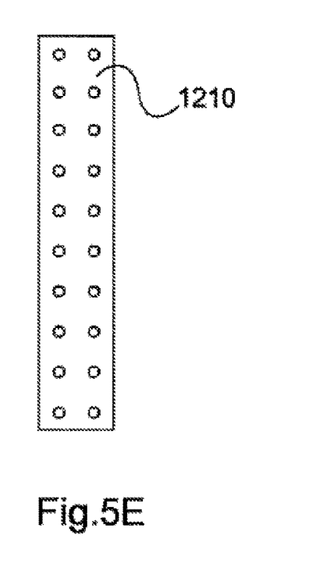
FIG. 5E shows a plan view of an end of a steel carrier as shown in FIG. 5A.

FIG. 5E shows a plan view of a first side of a steel carrier of a foundation. The first side 1210 is welded in particular to a fixing portion 1160 of the central unit 1100.

Figure 5F:
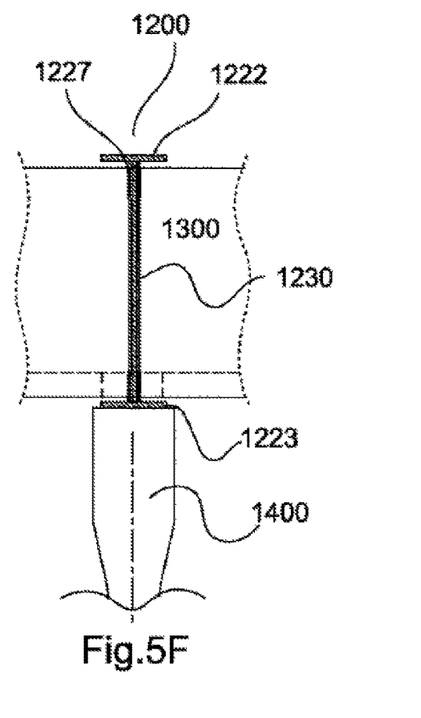
FIG. 5F shows a diagrammatic view of a portion of a foundation of a wind power installation.
Figure 5G:
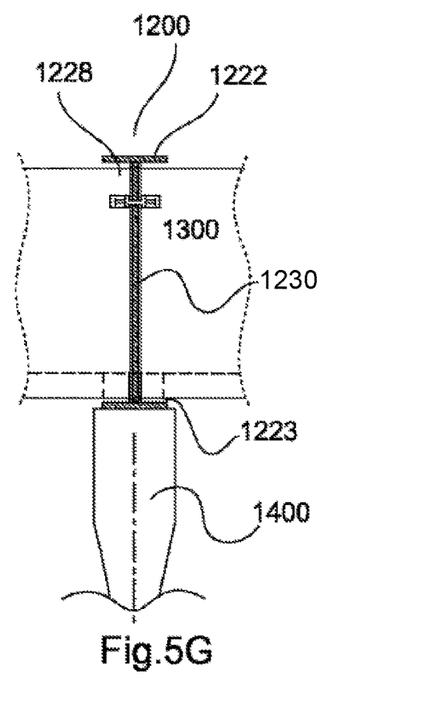
FIG. 5G shows a diagrammatic view of a portion of a foundation of a wind power installation.

FIGS. 5F and 5G each show a portion of a foundation of a wind power installation. In particular FIG. 5F shows a plan view of a second side 1220. The steel carrier 1200 has a first (lower) end 1223, a second (upper) end 1222 and a plate 1230 therebetween. Pressure pads 1227 for example of polymer can be provided between the plate 1230 and the precast foundation parts 1300.

FIG. 5G does not have any pressure pads but spindles in a pocket 1228 between the precast concrete parts and the steel arm 1200.

FIGS. 6A-6H show various views of precast concrete parts of the wind power installation foundation. The precast concrete parts 1300 are placed between adjacent steel carriers or steel arms 1200 of the foundation of the wind power installation. The precast concrete parts 1300 are divided into three and thus have a first, a second and a third part 1310, 1320, 1330. The first precast concrete parts 1310 is provided at the outer edge, the second precast concrete part 1320 in the middle and the third precast concrete part 1330 in the inside.

Figure 6A:
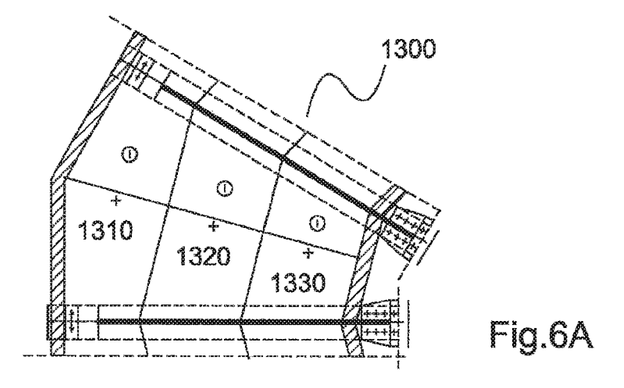
FIGS. 6A-6H show various views of precast concrete parts of the foundation of the wind power installation.

The first and second precast concrete parts 1310, 1320 each have a wall so that the precast concrete parts 1310-1330 and the adjacent steel carriers 1200 define a trough which can be filled by gravel, sand, earth, concrete 2000.

Figure 6B:
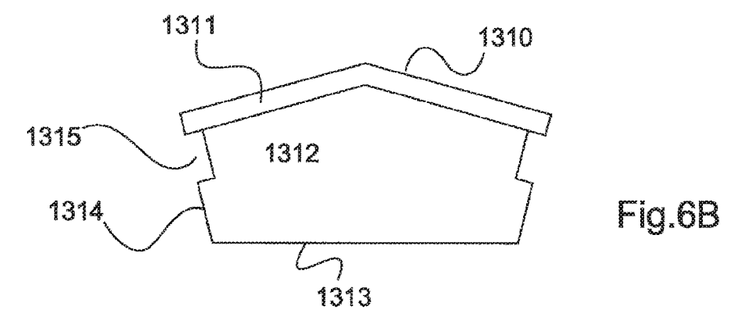
Figure 6C:
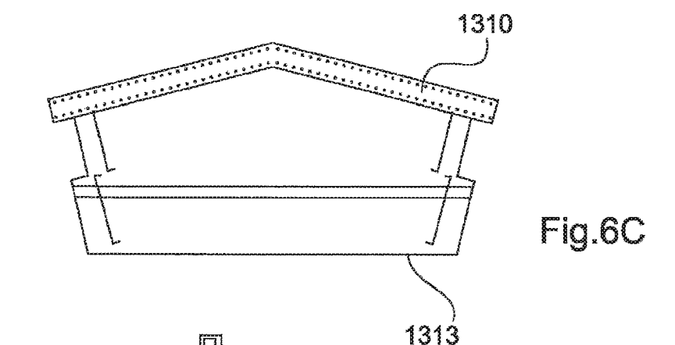
Figure 6D:
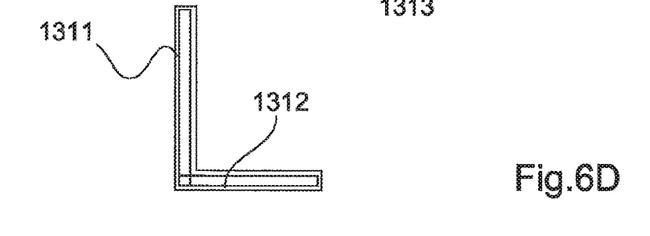

FIGS. 6B through 6D show various views of the first precast concrete part 1310. The first precast concrete part 1310 has a wall 1311, a bottom 1312 and a straight side 1313 disposed in opposite relationship to the wall 1311. In this case the wall 1311 is substantially at a right angle to the bottom 1312. The first precast concrete part 1310 is of a substantially pentagonal configuration, with a respective recess 1315 being provided at the two sides 1314.

Figure 6E:
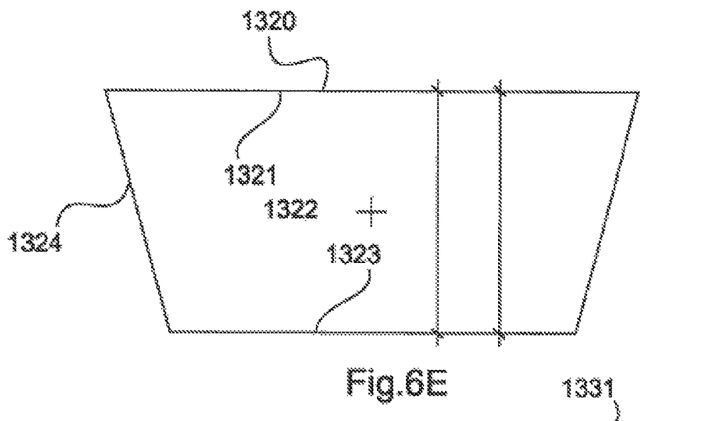
Figure 6F:
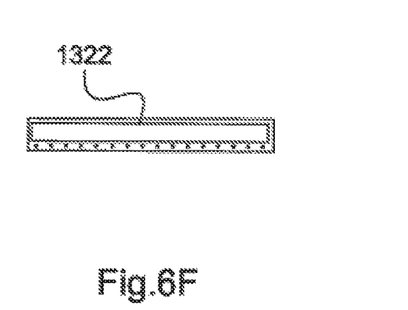

FIGS. 6E and 6F show various views of the second precast concrete part. The second precast concrete part 1320 has a first and a second side 1321, 1323 which are arranged parallel to each other. The second precast concrete part 1320 also has two side surfaces 1324 and a bottom 1322.

Figure 6G:
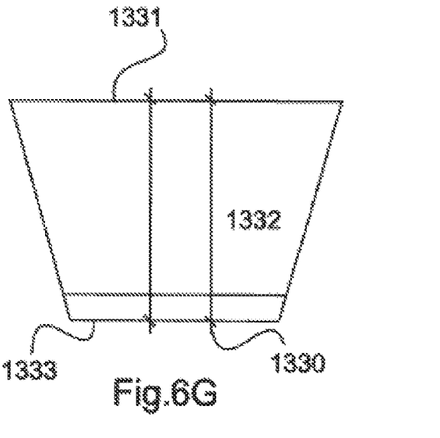
Figure 6H:
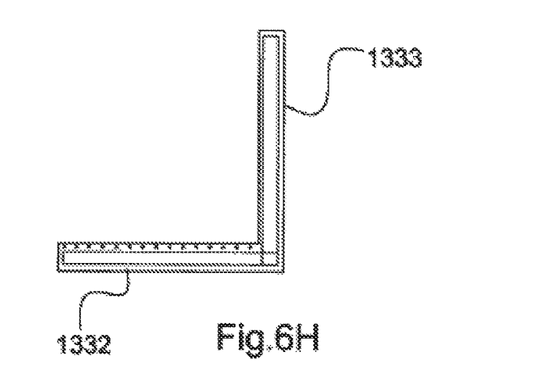

FIGS. 6G and 6H show various views of the third precast concrete part 1330. The third precast concrete part 1330 has a wall 1333 and a first side 1331 which are arranged parallel to each other. The third precast concrete part 1330 also has a bottom 1332 which is substantially at a right angle to the wall 1333.

The invention claimed is:

1. A wind power installation pile foundation, comprising:
a cylindrical central unit;
a plurality of steel carriers arranged radially around the central unit and having first and second ends, respectively, wherein the first ends of the plurality of steel carriers are fixed to the central unit and the second ends of the steel carriers are free ends;
a plurality of foundation piles at least partially in a ground, wherein the second free ends of the steel carriers are respectively placed on the plurality of foundation piles; and
a plurality of precast concrete parts between adjacent steel carriers so that the precast concrete parts and the adjacent steel carriers, respectively, form a trough configured to be filled with at least one of: concrete, gravel or earth.

2. The wind power installation foundation as set forth in claim 1, further comprising:
a plurality of leveling plates arranged on the plurality of foundation piles and after suitable leveling, receive the second free ends of the plurality of steel carriers.

3. The wind power installation foundation as set forth in claim 1 wherein the central unit has a first end and a second end, wherein a lower pylon segment of a wind power installation or a pylon section is configured to be placed on the second end of the central unit.

4. The wind power installation foundation as set forth in claim 1 wherein the plurality of steel carriers have reinforcing struts in a region of the second ends.

5. The wind power installation foundation as set forth in claim 1 further comprising a plurality of foundation anchors, wherein the plurality of foundation piles have upper end regions and the foundation anchors are at the upper end regions and configured to fix the second ends of the plurality of steel carriers, respectively.

6. The wind power installation foundation as set forth in claim 5 wherein the plurality of foundation piles have a first, second, and third portions, wherein a diameter of the third portion is larger than a diameter of the first portion or a diameter of the second portion.

7. The wind power installation foundation as set forth in claim 6 wherein the first, second, and third portions of the plurality of foundation piles are each a tube shape.

8. The wind power installation foundation as set forth in claim 6 wherein the plurality of foundation piles, respectively, have a plurality of struts or bars extending in the longitudinal direction and at least one coil.

9. The wind power installation foundation as set forth in claim 6 wherein the plurality of foundation piles are filled with concrete.

10. A wind power installation, comprising:
a wind power installation foundation as set forth in claim 1.

11. A method of producing a wind power installation pile foundation, the method comprising:
providing a cylindrical central unit;
placing a plurality of steel carriers radially around the central unit, wherein the plurality of steel carriers have first and second ends, wherein the first ends of the plurality of steel carriers are fixed to the central unit and the second ends free ends;
placing a plurality of foundation piles at least partially in a ground, wherein the second free ends of the steel carriers are respectively placed on the ends, projecting out of the ground, of the foundation piles;
placing a plurality of precast concrete parts between adjacent steel carriers of the plurality of steel carriers so that at least one respective trough is formed by the precast concrete parts and the adjacent steel carriers; and
filling the at least one trough with at least one of concrete, gravel or earth.

12. Use of a wind power installation foundation as set forth in claim 1 in a permafrost ground.

* * * * *